Patented Aug. 14, 1923.

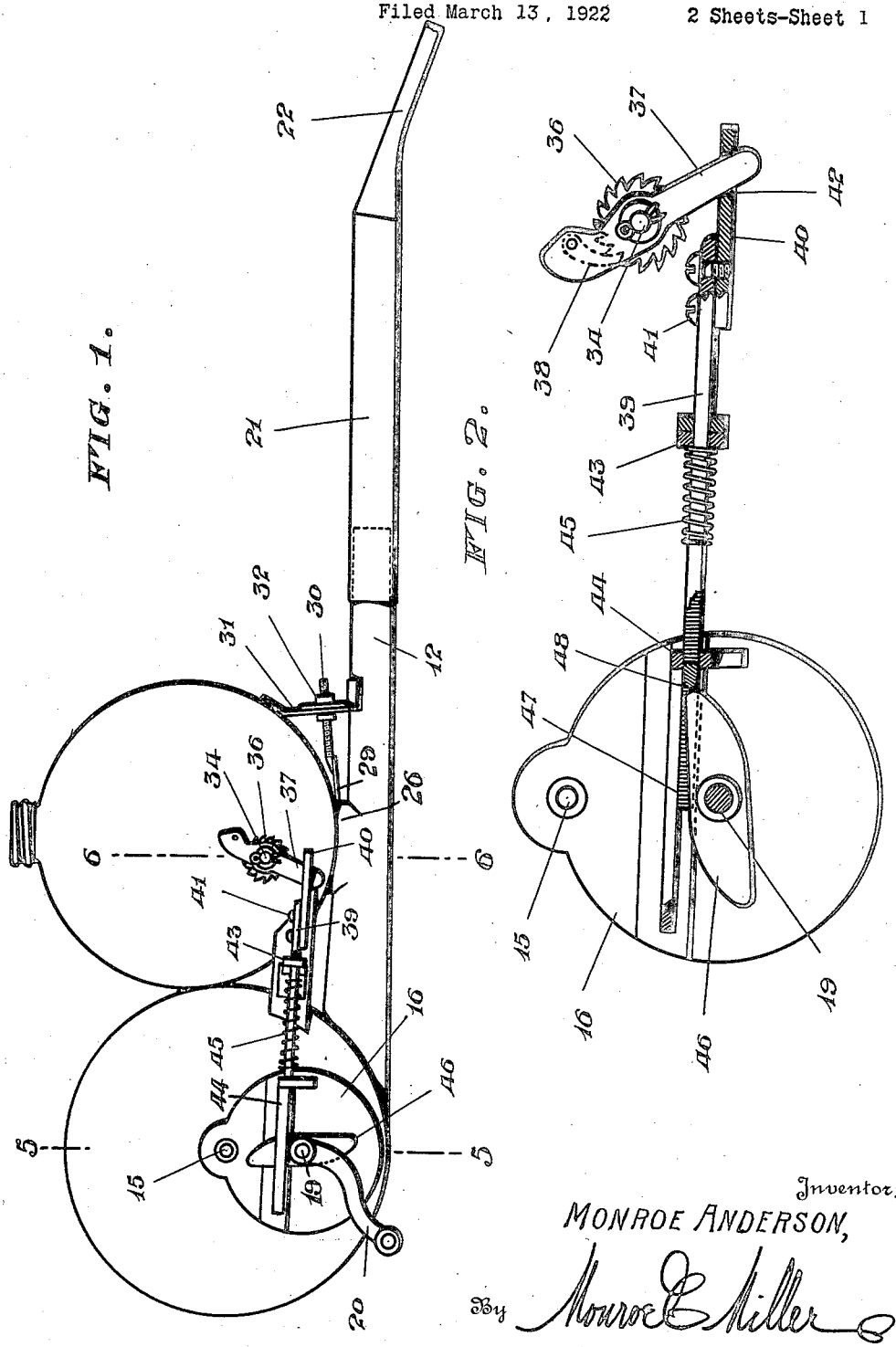

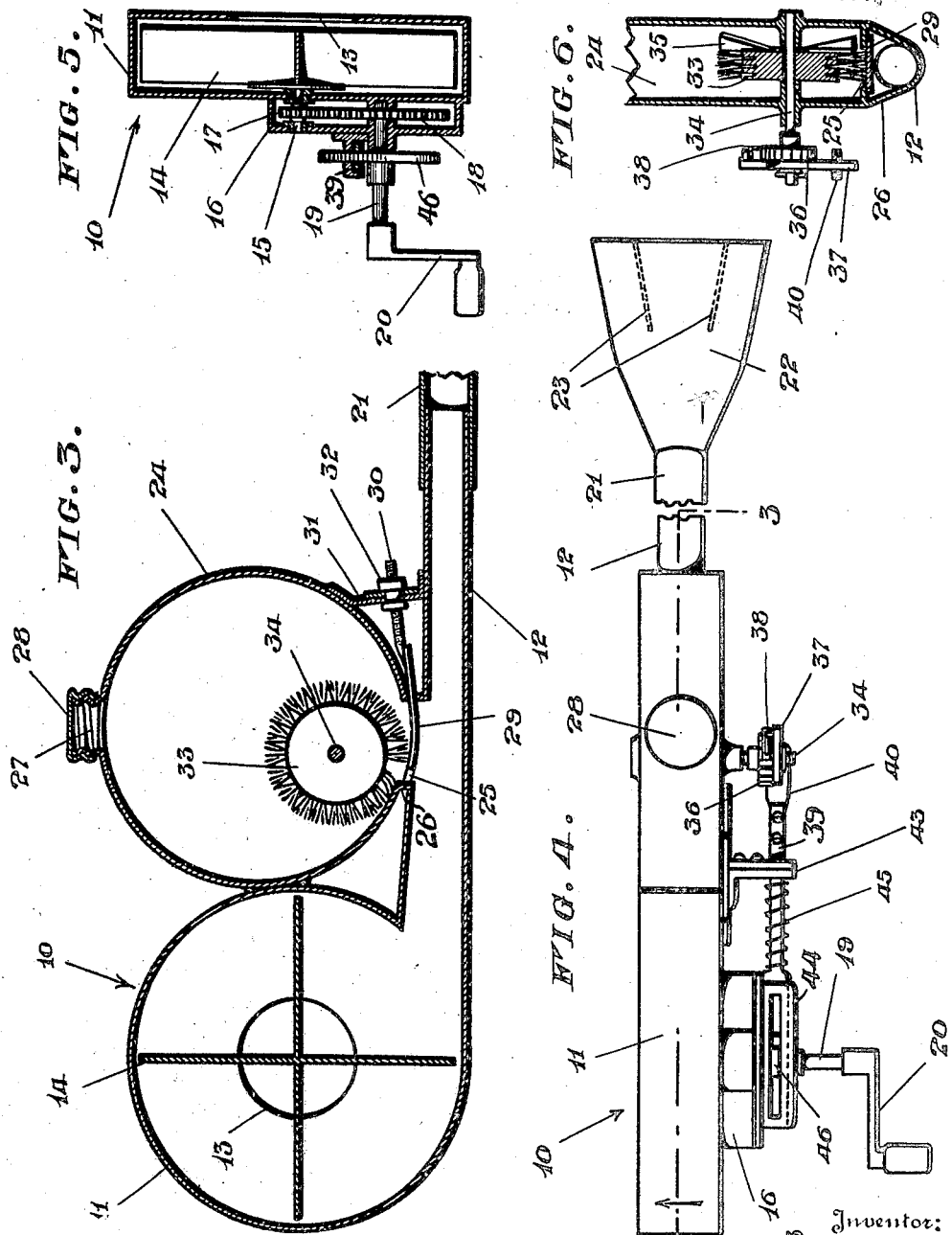

1,464,799

UNITED STATES PATENT OFFICE.

MONROE ANDERSON, OF PEMBROKE, KENTUCKY.

POWDER SPRAYER.

Application filed March 13, 1922. Serial No. 543,436.

*To all whom it may concern:*

Be it known that I, MONROE ANDERSON, a citizen of the United States, residing at Pembroke, in the county of Christian and State of Kentucky, have invented certain new and useful Improvements in Powder Sprayers, of which the following is a specification, reference being had therein to the accompanying drawing.

The present invention relates to powder sprayers, and aims to provide a novel and improved sprayer for distributing or blowing powder, and adapted especially for spraying tobacco, fruits, vegetables, and other vegetation with insect powder, although useful for other purposes, such as for spraying fire-extinguishing powder, powdered sand, and the like for which the device is suited.

Another object is the provision of a powder sprayer comprising a novel construction and combination of an air blower and powder magazine.

A further object is the provision of novel means for feeding the powder to the discharging stream of air and regulating the feed thereof.

A still further object is the provision of powder feeding and controlling means operated automatically by the actuating means of the blower.

With the foregoing and other objects in view, which will be understood as the description proceeds, the invention resides in the construction and arrangement of parts, as hereinafter described and claimed, it being understood that changes can be made within the scope of what is claimed, without departing from the spirit of the inventon.

The invention is illustrated in the accompanying drawings, wherein—

Figure 1 is a side elevation of the improved sprayer.

Fig. 2 is an enlarged detail view of the actuating means for the powder feeder, portions being shown in section.

Fig. 3 is a longitudinal section on the line 3—3 of Fig. 4.

Fig. 4 is a plan view of the device, portions being broken away.

Figs. 5 and 6 are sections on the respective lines 5—5 and 6—6 of Fig. 1.

The sprayer uses an air blower or fan 10 having the circular casing 11 which is relatively flat, and from which a discharge pipe 12 extends tangentially. One side of the casing 11 has a central air inlet opening 13, and the rotor within the casing is composed of the radial blades 14 which in being rotated (counter clockwise as seen in Fig. 3) will draw air into the casing through the inlet opening 13 and discharge same forcefully through the pipe 12. The rotor is carried by a stub shaft 15 journaled through the side of the casing opposite to the opening 13 and also journaled in a gear case 16 secured to the corresponding side of the casing 11. A pinion 17 is secured on the shaft 15 within the case 16 and meshes with a gear wheel 18 of larger diameter also disposed in said case and secured on a shaft 19 journaled in the wall of the case 16 and the corresponding wall or side of the blower casing 11. The shaft 19 has a hand crank 20, as shown, which when rotated will rotate the rotor of the blower at a high speed for creating a strong current of air through the discharge pipe. The gears are housed within the gear case 16 to be protected from foreign matter.

The air can be discharged through a suitable spray head or nozzle. In the embodiment of the invention as shown an extension 21 is telescoped on the discharge end of the pipe 12 and is provided at its extremity with a fan-shaped nozzle 22 for spraying the powder in a fan-shaped stream, to spread the powder over a considerable area. The nozzle 22 has deflectors 23 therein diverging to the mouth of the nozzle, to assist in spreading the powder and air which is discharged through said nozzle. The nozzle is preferably arranged at an angle with the pipe 21 and can be turned to discharge the air and powder at the desired angle.

The powder magazine or supplying means includes a receptacle or chamber 24, which is also preferably of circular shape and relatively flat, like the blower casing 11. As shown, the discharge pipe 12 extends horizontally from the blower casing under the chamber 24, and said chamber is secured, by soldering or otherwise, to the casing 11, and is also mounted on the pipe 12, the bottom of the chamber and top of said pipe having an opening 25 for the flow of the powder from said chamber into the pipe to mix with the air. A spout 26 connects the bottom of the chamber and top of the pipe 12 to prevent the escape of powder from between said chamber and pipe. The chamber 24 has an upper filling neck 27 normally closed by a screw cap 28, for the convenient filling of the chamber with powder.

In order to regulate the flow of powder from the chamber through the opening 25, a slide valve 29 is slidable through one wall of the spout 26 under the bottom of the chamber 24 and can be projected more or less into the opening 25 to regulate the flow of powder. The valve 29 has a threaded stem 30 projecting from its outer end and an adjusting nut 32 is threaded on said stem and is swivelled in a prop 31 connecting the pipe 12 and chamber 24. Thus, by turning the nut 32, the valve is conveniently adjusted, and said valve is curved and preferably resilient to press upwardly against the bottom of the chamber or receptacle 24.

The powder feeder includes a rotary circular brush 33 within the chamber 24 secured on a shaft 34 journaled transversely through the chamber above the opening 25, so that the bristles at the bottom of the brush press down on the bottom of the chamber 24 and valve 29, as seen in Fig. 3. The brush is preferably provided at one side with an agitator 35 to loosen the powder and cause it to flow to the bottom of the chamber under the brush. The brush being rotated will feed the powder to the opening 25, and the brush will also break up any lumps of powder, so that the powder is fed to the stream of air slowly and evenly.

The powder feeder or brush is operated from the operating means of the blower. Thus, a ratchet wheel 36 is secured on the protruding terminal of the shaft 38 and an oscillatory arm 37 is mounted loosely on said shaft and has a pawl 38 to engage said ratchet wheel, whereby the oscillation of the arm 37 will rotate the ratchet wheel 36 and brush 33 intermittently. A reciprocating bar 39 has a piece 40 secured to one end by means of screws 41 or otherwise, and has a slot 42 receiving the arm 37, whereby the reciprocation of said bar will oscillate said arm. The bar 39 is slidable in a guide 43 secured to and located between the casing 11 and the chamber 24 at one side thereof, and said bar is further slidable in a guide 44 secured to the gear case 16. A coil spring 45 surrounds said bar and is confined between a shoulder of the bar and the guide 43 to normally retract said bar to the position as seen in Figs. 1 and 4. A double cam 46 is secured to the shaft 19 and works within a slot 47 in the bar 39 to bear against a cross portion 48 of said bar and shove the bar forwardly to the position as seen in Fig. 2. Thus, when the shaft 19 is rotated for operating the blower, the cam 46 will intermittently force the bar 39 forwardly and then release it, the spring 45 returning said bar with a sharp or quick movement when the cam passes the portion 48 and releases same, so as to jar or vibrate the device, to loosen the powder, as will be apparent. The bar 39 is thus reciprocated by the cam 46 which revolves with the shaft 19, and the arm 37 is thus oscillated for turning the feeder brush 33 intermittently. The powder is thus fed automatically to the air in proportion to the speed of the blower and air current.

Having thus described the invention, what is claimed as new is:—

1. A powder sprayer comprising a blower having a discharge pipe and actuating means, a powder chamber having an outlet to discharge into said pipe, a powder feeder in said chamber working over said outlet, a reciprocatory member operatively connected with the feeder, means operated by said actuating means for moving said member in one direction and releasing same intermittently, and spring means for moving said member in the opposite direction with a sharp movement when said member is released.

2. A powder sprayer comprising a blower having a discharge pipe and actuating means, a powder chamber having an outlet to discharge into said pipe, a rotary powder feeder in said chamber working over said outlet, a reciprocatory member, a ratchet connection between said member and feeder for turning the feeder step by step when said member is reciprocated, means movable with said actuating means for moving said member in one direction and releasing same intermittently, and spring means for moving said member in the opposite direction with a sharp movement when said member is released.

3. A powder sprayer comprising a blower having a discharge pipe and actuating means including a shaft, a powder chamber having an outlet to discharge into said pipe, a rotary powder feeder in said chamber working over said outlet, a ratchet wheel rotatable with said feeder, an oscillatory member having a pawl engageable with the ratchet wheel for turning same in one direction, a reciprocatory member engaging said oscillatory member, and a cam rotatable with said shaft for reciprocating the reciprocatory member.

4. A powder sprayer comprising a blower casing having a discharge pipe, a gear case secured to said casing, a rotor in the casing having a shaft journaled in said case, a drive shaft journaled in said case, gears connecting said shafts in said case, a powder chamber mounted on said pipe and having an outlet to discharge into the pipe, a rotary brush in said chamber working over said outlet, a transverse shaft journaled in the chamber to which said brush is secured, a ratchet wheel secured to the last named shaft, an oscillatory arm mounted on the last named shaft and having a pawl to engage said ratchet wheel, a cam carried by said drive shaft, and a reciprocatory member operated by said cam and connected to said arm.

In testimony whereof I hereunto affix my signature.

MONROE ANDERSON.